(No Model.)
G. B. HOWLAND.
GRAIN SEPARATOR AND CLEANER.
No. 458,713. Patented Sept. 1, 1891.
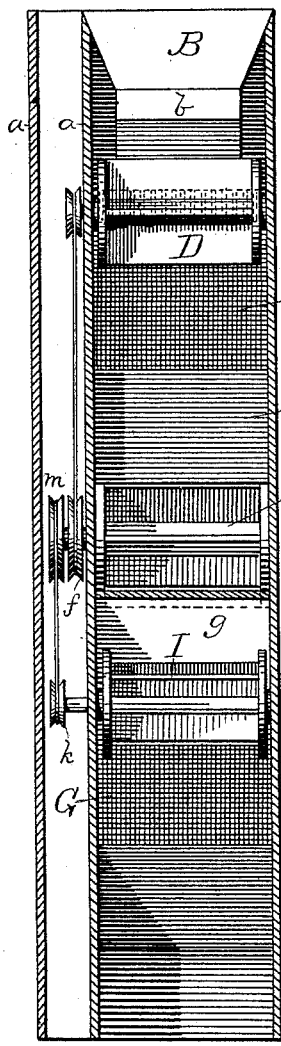
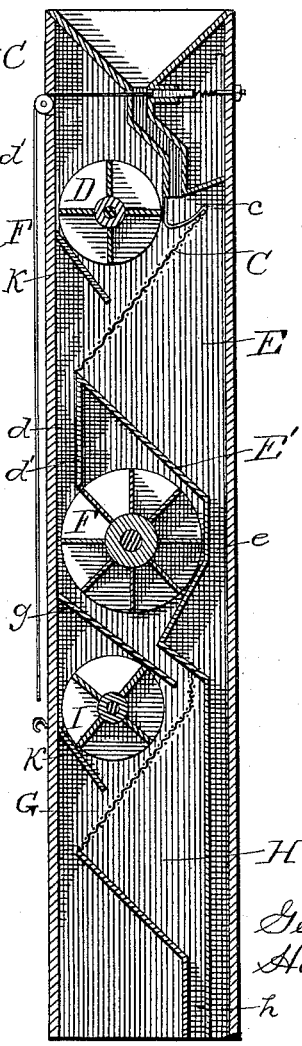
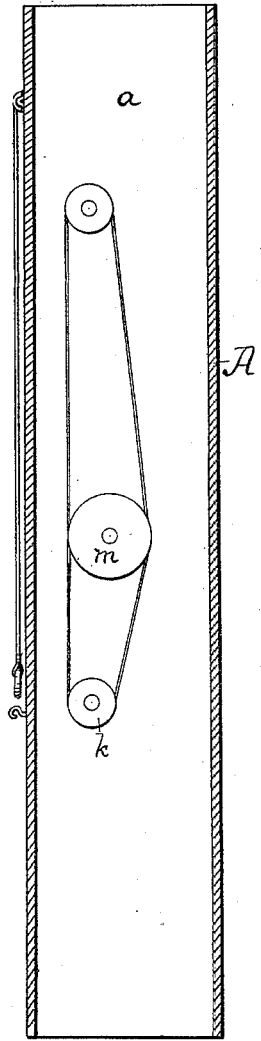
Witnesses
F. H. Goin.
Wm. J. Nelson
George Benjamin Howland
Inventor
By his Attorney
Frank D. Thomason

UNITED STATES PATENT OFFICE.

GEORGE BENJAMIN HOWLAND, OF PONTIAC, ILLINOIS.

GRAIN SEPARATOR AND CLEANER.

SPECIFICATION forming part of Letters Patent No. 458,713, dated September 1, 1891.

Application filed March 7, 1890. Serial No. 343,034. (No model.)

*To all whom it may concern:*

Be it known that I, GEORGE BENJAMIN HOWLAND, of Pontiac, Livingston county, Illinois, have invented certain new and useful Improvements in Grain Separators and Cleaners, of which the following is a full, clear, and exact description, reference being had to the accompanying drawings, and to the letters of reference marked thereon.

The object of my invention is to provide a grain separator and cleaner which, while capable for use to separate and clean any kind of grain, is particularly adapted for separating foreign matter from oats and cleaning the same. My invention accomplishes this, moreover, in such manner as to thoroughly get rid of the fine dust which heretofore has been thought to be inseparably connected with oats and which is recognized and dreaded by horsemen especially as provocative of the disease known as "heaves" among horses, substantially as hereinafter fully described, and as illustrated in the drawings, in which—

Figure 1 is a front elevation of my invention with the front of the case removed. Fig. 2 is the side elevation thereof with the side of the case removed, and Fig. 3 is a transverse vertical section therethrough.

Referring to the drawings, A represents a vertical rectangular case, which is about five or six feet in length and has double side walls $a\ a$ on one side, so as to leave between the two a dead-space, and so as to provide for the accommodation of a system of belting therein, as will hereinafter be more fully explained. In the upper end of the case is a hopper B, whose outlet empties into a passage $b$, which pursues a straight course downward a short distance, is then deflected obliquely to the right a distance corresponding to about one-fourth the depth of the case, and then goes perpendicularly downward again and empties into a basin made of parallel bars or wires $c\ c$. Wires $c\ c$ are attached to the lower edge of the forward wall of passage $b$ and continued down in alignment therewith a short distance, whereupon they turn to the rear, preferably curving upward as they do so, and terminate within two or three inches of the rear of the case, at which point they are suitably connected to the upper edge of the screen C. The lower edge of the rear wall of passage $b$ is connected by a partition to the rear wall of the case. The space between the parallel bar $c$ is sufficient to permit the oats to fall through, but not sufficient to let larger particles of foreign stuff, such as straw, chips, &c., to get through. This straw, &c., collected on bars $c$ is blown off as soon as it lodges thereon by a blast of air generated by the fan D, which, as shown, is located between the front of the case and the vertical part of bars $c$ and the wall of passage $b$, to which they are attached, and is journaled in the side walls of case A. Screen C pursues an oblique downward course to within about the same distance of the front wall of the case as its upper edge is from the rear wall, where the oats, which, falling through bars $c$, have been screened thereon, are emptied into a passage $d$, made between the front wall of the case and partition $d'$. The stuff which fails to pass through bars $c$ and is blown off therefrom and the dirt and siftings which pass through screen C fall into a dust-chamber E, the floor E' of which, commencing at the lower edge of said screen, inclines downward therefrom toward the rear of the case at such a pitch that the accumulations thereon of foreign matter gravitate down into the dust-flue $e$, made between the rear wall of the case and a vertical continuation of floor E'. The oats which pass through passage $d$ fall into the buckets of the breast-wheel F and revolve the same with sufficient rapidity that it, through the medium of a pulley $f$ on the end of its axis, which extends through its bearings into the space between $a\ a$ and a suitable belt, operates fan D. The grain, after actuating wheel F, drops onto and gravitates down the inclined floor $g$, which latter terminates before it reaches the forward wall of a continuation of dust-flue $e$, and is deposited onto the screen G. Screen G extends from the forward wall of flue $e$ obliquely downward to within a short distance of the front of case A, where it connects with the floor of the dust-chamber H, into which the siftings from screen G fall. The floor of chamber H inclines downward to the rear and terminates within a short distance of the front wall of dust-flue $e$, where it also terminates in a dust-flue $h$. Dust-flue

*e* may terminate a suitable distance below where screen G connects to its front wall and mingle its contents with those of flue *h*, which continue down to the lower end of case A and discharge into a box, bag, or other suitable dust-receptacle.

Immediately in front of screen G and under the floor *g* of the chamber in which the actuating-wheel is located is a fan I, which is journaled in the side walls of the case A, and has its journal passing through the inner side wall *a*, extended and provided with a suitable pulley *k*, which is connected by a suitable belt to a pulley *m* next to pulley *f* on the shaft or axis of wheel F.

Secured to and extending from the front wall of case A, just below the plane of the axis of fans D and I, and inclined downward therefrom at a pretty steep pitch are the deflectors K K, which extend toward the screens, but not sufficiently to impede in any way the free progress of the grain. These deflectors direct the blast from the fan more directly through the moving grain, but while I prefer their use they may be dispensed with.

The operation of my invention is substantially as follows: The grain falling from the hopper and through passage *b* first strikes against and drops through bars *c c*, where, leaving the coarse foreign stuff, it strikes and is sifted upon screen C. From screen C it is directed to and actuates wheel F, and from thence it is directed to and sifted on screen G, from which it falls into the receptacle made for it. The fan D blows the coarser foreign stuff off of bars *c* into chamber E, and at the same time blows such chaff, dirt, and dust as may be rubbed off of and detached from the grain through the said sieve C into said chamber E, which dust, &c., is conducted both by gravity and the current of air down through flue *e* into the dust-receptacle. When the grain strikes wheel F, besides actuating it, any lumps or clusters of grain which have stuck together and have not before separated are thoroughly disintegrated. The fan I performs a similar office as fan D, and of the two fans is the most important, because it removes the dust after the grain has been so agitated that any foreign matter which adhered to it is apt to become separated therefrom and easily removed by the blast.

While it is desirable that the foreign stuff mixed with and adhering to oats should be removed, yet it is not considered as necessary, because not so dangerous to horses, as that the dirt and dust should be removed. It is the dust which is really dangerous. I do not therefore consider the bars *c* as an indispensable feature of my invention, although I prefer their use. I do not, moreover, wish to be confined to the use of both fans D and I, for either may be dispensed with. If desired, I could add other screens similar to screens C and G to my separator and cleaner. In this event, though, I prefer to add fans likewise.

The proportions of my invention may or may not be like those stated, and the construction of the frame-work may be different so long as the spirit of my invention is not departed from.

What I claim as new is—

1. In a grain separator and cleaner, a casing having a hopper located at its upper end, parallel bars upon which the grain from said hopper is delivered, a downwardly-inclined screen on the upper end of which said grain falls after passing between said bars, a vertical grain-passage into which said grain is precipitated from said screen, and a dust-chamber beneath said screen and back of said parallel bars separated from said grain-passage, in combination with a revolving fan journaled above and directing a current of air through said screen into said dust-chamber and through said parallel bars, so as to assist in the removal of the larger particles of foreign substances collected thereon.

2. In a grain separator and cleaner, a casing having a hopper located at its upper end, parallel bars upon which the grain from said hopper is delivered, a downwardly-inclined screen onto the upper end of which said grain falls after passing between said bars, a dust-chamber under said screen, and a grain-passage into and down through which the grain gravitates from the screen, in combination with wheel F, located below said grain-passage and actuated by the grain delivered therefrom, and a revolving fan driven by wheel F and journaled above and directing a current of air through said screen.

3. In a grain separator and cleaner, a casing having a hopper located at its upper end, a downwardly-inclined screen onto the upper end of which said grain is delivered, a dust-chamber under said screen, and a grain-passage into and down through which the grain gravitates from said screen, in combination with wheel F, located below said grain-passage and actuated by the grain delivered therefrom, and a revolving fan driven by wheel F and journaled above and directing a current of air through said screen.

4. The combination, with case A, hopper B in its upper end, bars *c*, having their horizontal parts curved upward toward their rear ends, which latter do not touch the rear wall of case A, downwardly-inclined stationary screen C, to the upper edge of which the rear extremities of said bars are secured, and dust-chamber E below said screen, of the revolving fan D above the same, as set forth.

GEORGE BENJAMIN HOWLAND.

Witnesses:
P. B. COOLIDGE,
F. D. THOMASON.